US012812421B2

(12) United States Patent
Sarkar et al.

(10) Patent No.: US 12,812,421 B2
(45) Date of Patent: Nov. 24, 2026

(54) END TO END PREDICTIVE GENAI DRIVEN 6G/5G NETWORK OPTIMIZATION, OPERATIONS AND CAPACITY PLANNING

(71) Applicant: AT&T Intellectual Property I, L.P., Atlanta, GA (US)

(72) Inventors: Anandarup Sarkar, Belle Mead, NJ (US); Syed Anwar Aftab, Budd Lake, NJ (US); Abbas Munawar Fazal, Bridgewater, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 29 days.

(21) Appl. No.: 18/973,194

(22) Filed: Dec. 9, 2024

(65) Prior Publication Data

US 2026/0164267 A1 Jun. 11, 2026

(51) Int. Cl.
*H04W 24/06* (2009.01)
*H04L 41/16* (2022.01)

(52) U.S. Cl.
CPC ............. *H04W 24/06* (2013.01); *H04L 41/16* (2013.01)

(58) Field of Classification Search
None
See application file for complete search history.

(56) References Cited

U.S. PATENT DOCUMENTS

| | | | | |
|---|---|---|---|---|
| 10,491,460 | B2 * | 11/2019 | Gilligan | H04L 43/0817 |
| 10,638,363 | B2 * | 4/2020 | Gottwerth | H04L 67/52 |
| 10,649,882 | B2 * | 5/2020 | Li | G06F 11/008 |
| 12,407,581 | B1 * | 9/2025 | Vasseur | H04L 41/046 |
| 12,432,128 | B2 * | 9/2025 | Tulczyjew | H04L 43/067 |
| 12,489,683 | B1 * | 12/2025 | Kulkarni | H04L 41/0895 |
| 12,506,653 | B2 * | 12/2025 | Mermoud | H04L 41/0631 |
| 12,526,208 | B2 * | 1/2026 | Vasseur | G06F 40/284 |
| 2007/0124368 | A1 * | 5/2007 | Weiser | G08B 27/00 370/310 |
| 2019/0065343 | A1 * | 2/2019 | Li | G06F 11/008 |
| 2019/0313280 | A1 * | 10/2019 | Gottwerth | H04L 67/52 |
| 2025/0150328 | A1 * | 5/2025 | Vasseur | H04L 41/0636 |
| 2025/0150357 | A1 * | 5/2025 | Vasseur | H04L 41/16 |
| 2025/0217715 | A1 * | 7/2025 | So | G06N 20/10 |
| 2025/0280066 | A1 * | 9/2025 | Amin | H04M 3/2218 |
| 2025/0373495 | A1 * | 12/2025 | Kulkarni | H04L 41/0895 |
| 2026/0037840 | A1 * | 2/2026 | Schornig | G06N 5/04 |

* cited by examiner

*Primary Examiner* — Backhean Tiv
(74) *Attorney, Agent, or Firm* — Guntin & Gust, PLC; Andrew Gust

(57) ABSTRACT

Aspects of the subject disclosure may include, for example, a device that trains a Network Large Language Model (NLLM) using 3GPP specifications, carrier-specific call flows, and historical failure data. An interactive Generative AI-driven chatbot queries the NLLM for predictive network maintenance, generating potential failure patterns and resolution hints. A simulation engine evaluates these patterns, and the system modifies network configurations to prevent failures, continuously improving the NLLM with simulation results and feedback. Other embodiments are disclosed.

20 Claims, 7 Drawing Sheets

200

200

200B

300

600

END TO END PREDICTIVE GENAI DRIVEN 6G/5G NETWORK OPTIMIZATION, OPERATIONS AND CAPACITY PLANNING

FIELD OF THE DISCLOSURE

The subject disclosure relates to generative AI used in network maintenance.

BACKGROUND

Network call flow failures can significantly impact service reliability, customer experience, and operational costs. Traditional methods for troubleshooting these failures often rely on manual intervention and static rule-based approaches, which can be time-consuming and prone to inaccuracies. These traditional methods struggle to adapt to the continuously evolving nature of network designs and the emergence of new failure patterns that have not been previously encountered.

BRIEF DESCRIPTION OF THE DRAWINGS

Reference will now be made to the accompanying drawings, which are not necessarily drawn to scale, and wherein.

DETAILED DESCRIPTION

Figure 1:
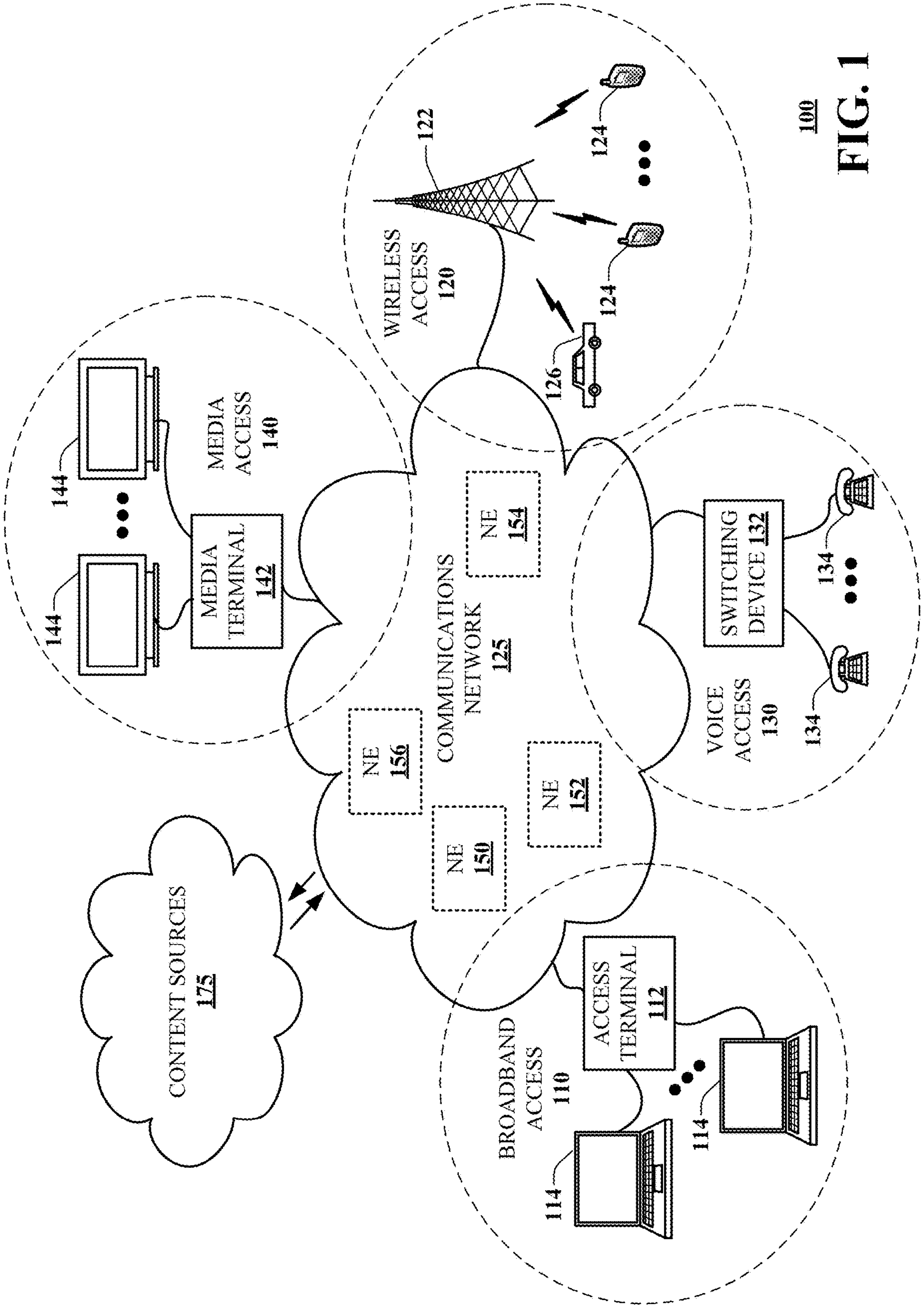
FIG. 1 is a block diagram illustrating an exemplary, non-limiting embodiment of a communications network in accordance with various aspects described herein.

The subject disclosure describes, among other things, illustrative embodiments for Generative AI-driven predictive maintenance for communications networks. Other embodiments are described in the subject disclosure.

Various embodiments described herein provide comprehensive solutions for predictive maintenance in 6G/5G networks using a Network Large Language Model (NLLM) and Generative AI-driven chatbot. The system is designed to address the limitations of traditional AI approaches by proactively identifying potential call flow failures and recommending solutions before they occur. In some embodiments, this is achieved through a series of operations that leverage advanced AI techniques and continuous learning from network data.

Initially, the NLLM is trained using a combination of 3GPP specifications, carrier-specific call flow specifications, historical call failure traces, and corresponding successful resolutions. This extensive training dataset enables the NLLM to understand the complexities of network operations and the various factors that can lead to call flow failures. By incorporating both standard and carrier-specific data, the NLLM is tailored to the unique requirements and configurations of the network it is designed to maintain. In one or more embodiments, various other training techniques and/or training data can be utilized (which may or may not include the techniques and/or data described above and below) for providing, managing and/or fine-tuning Artificial Intelligence (AI) modeling that operates in conjunction with one or more of the features described herein including the LLM operating as an NLLM.

Once trained, the NLLM powers an interactive Generative AI-driven chatbot that network operators can use to perform predictive network maintenance. The chatbot allows operators to query the NLLM for potential call flow failure patterns that have not been previously encountered in the network. In response to these queries, the NLLM generates new potential failure patterns and provides resolution hints. This capability may be particularly valuable in dynamic network environments where new failure patterns can emerge that are not represented in historical data.

To provide for the practical applicability of the generated failure patterns and resolution hints, in some embodiments the system includes a simulation engine that evaluates the likelihood of occurrence of the potential call flow failure patterns and the effectiveness of the recommended resolutions. In some embodiments, these simulations are conducted in a controlled environment, typically during off-business hours, to minimize the impact on live network operations. Further, in some embodiments, the results of these simulations are then fed back into the NLLM, enabling continuous learning and improvement of the model's predictive capabilities.

In some embodiments, based on the simulation results, the network configuration can be modified as per the recommendation of the system to prevent the predicted call flow failures from occurring. This proactive approach to network maintenance helps to increase network performance, reduce the likelihood of service disruptions, and improve overall customer experience. Additionally, in some embodiments, the system may continuously monitor network performance Key Performance Indicators (KPIs) during the process to detect and mitigate any adverse impacts.

Accordingly, the various embodiments described herein may provide a robust and adaptive solution for predictive maintenance in 6G/5G networks, leveraging the power of Generative AI and continuous learning to stay ahead of potential failures and ensure optimal network performance. This approach not only addresses the limitations of traditional AI methods but also offers a scalable and efficient way to manage the increasing complexity of modern network infrastructures.

One or more aspects of the subject disclosure include a device, comprising: a processing system including a processor; and a memory that stores executable instructions that, when executed by the processing system, facilitate performance of operations. The operations may include training a Network Large Language Model (NLLM) using 3GPP specifications, carrier-specific call flow specifications for a network, historical call failure traces, and corresponding successful resolutions; providing an interactive Generative AI-driven chatbot configured to query the NLLM to perform predictive network maintenance; generating, by the NLLM, a potential call flow failure pattern that has not been previously encountered in the network; generating, by the chatbot, a resolution hint for the potential call flow failure pattern; and simulating, by a simulation engine, the potential call flow failure pattern to evaluate a likelihood of occurrence of the potential call flow failure pattern and an effectiveness of the resolution hint.

One or more aspects of the subject disclosure include a non-transitory machine-readable medium, comprising executable instructions that, when executed by a processing system including a processor, facilitate performance of operations. The operations may include training a Network Large Language Model (NLLM) using 3GPP specifications and carrier-specific call flow specifications for a network; providing an interactive Generative AI-driven chatbot configured to query the NLLM; receiving, by the chatbot, a query regarding potential call flow failures; and generating, by the NLLM, in response to the query, a potential call flow failure pattern that has not been previously encountered in the network.

One or more aspects of the subject disclosure include a method, comprising: training by a processing system including a processor, a Network Large Language Model (NLLM) using 3GPP specifications, carrier-specific call flow specifications for a network, historical call failure traces, and corresponding successful resolutions; generating, by the processing system using the NLLM, a potential call flow failure pattern that has not been previously encountered in the network; generating, by the processing system using the NLLM, a resolution hint for the potential call flow failure pattern; training the NLLM, by the processing system, using simulation results from a simulation of the potential call flow pattern and the resolution hint; and modifying a network configuration based on the simulation results to prevent the potential call flow failure pattern from occurring in the network.

Additional aspects of the subject disclosure may include training the NLLM using simulation results including the likelihood of occurrence of the potential call flow failure pattern; and modifying a network configuration based on the simulation results, as per the resolution hint of the system, to prevent the potential call flow failure pattern from occurring; wherein the training the NLLM comprises training using iterative prompt engineering by network domain experts; wherein the interactive Generative AI-driven chatbot is configured to provide real-time recommendations for network optimization based on the NLLM's predictions; wherein the simulation engine is configured to simulate the potential call flow failure pattern in a controlled environment during off-business hours to minimize impact on live network operations; continuously monitoring network performance Key Performance Indicators (KPIs) to detect and mitigate any adverse impact; training the NLLM using feedback from network operators to improve the NLLM's predictive accuracy and resolution recommendations; generating a report summarizing multiple potential call flow failure patterns and associated resolution hints and simulation results; and/or the NLLM being configured to prioritize potential call flow failure patterns based on their likelihood of occurrence and potential impact on network performance.

Referring now to FIG. 1, a block diagram is shown illustrating an example, non-limiting embodiment of a system 100 in accordance with various aspects described herein. For example, system 100 can facilitate in whole or in part Generative AI-driven predictive maintenance for communications networks. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
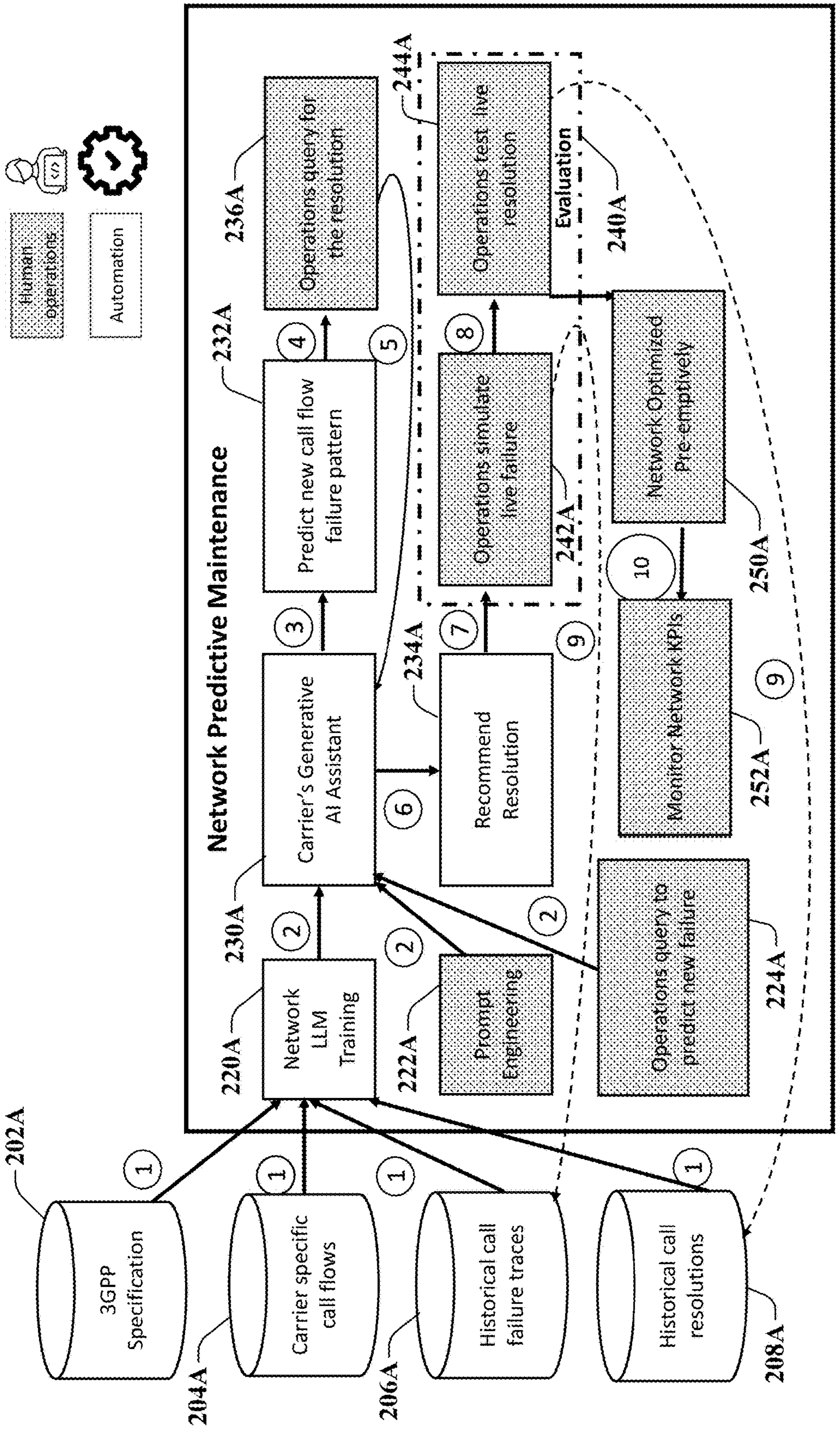
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system functioning within the communication network of FIG. 1 in accordance with various aspects described herein. System 200 illustrates a system for network predictive maintenance that may include 3GPP specification(s) 202A, carrier specific call flows 204A, historical call failure traces 206A, historical call resolutions 208A, Network Large Language Model (NLLM) training operation 220A, Generative AI Assistant 230A, new call flow failure pattern prediction operation 232A, resolution query operation 236A, resolution recommendation operation 234A, live failure simulation operation 242A, live resolution testing operation 244A, new failure prediction query operation 224A, network KPIs monitoring operation 252A, preemptive optimization of network operation 250A, prompt engineering operation 222A, and evaluation 240A.

3GPP Specification 202A provides the standard specifications for network operations. This component includes documents and guidelines from the 3rd Generation Partnership Project (3GPP). For example, the specification contains technical specifications for 5G and 6G networks. The 3GPP Specification 202A serves as a foundational input for training the Network Large Language Model (NLLM) 220A, ensuring that the model comprehends the standard protocols and procedures for network operations.

Carrier specific call flows 204A include the call flow processes and protocols used by a specific carrier. This component encompasses proprietary call flow diagrams and procedures. For example, in some embodiments, call flows 204A details how a particular network carrier's call flows differ from standard 3GPP specifications. Carrier specific call flows 204A provide the NLLM 220A with carrier-specific nuances, enabling the model to tailor predictions and recommendations to the configurations and requirements of the carrier's network.

Historical call failure traces 206A store records of past call failures. This component includes logs and data traces of network failures. For example, historical call failure traces 206A contain information on call drops and their causes. In some embodiments, historical call failure traces 206A are used for training the NLLM 220A, as they provide real-world examples of network issues, allowing the model to learn from past incidents and improve the predictive accuracy of the model.

Historical call resolutions 208A store the solutions applied to past call failures. This component includes documented resolution steps and outcomes. For example, historical call resolutions 208A detail how specific network issues were resolved. In some embodiments, historical call resolutions 208A are used to train the NLLM 220A, enabling the model to generate effective resolution hints for potential call flow failure patterns.

3GPP specification(s) 202A, carrier specific call flows 204A, historical call failure traces 206A, and historical call resolutions 208A may be implemented as data records stored in various types of storage devices and locations. These data records can be organized in databases, data warehouses, or other structured storage systems to facilitate efficient access and retrieval. The storage devices used may include high-capacity hard disk drives (HDDs), solid-state drives (SSDs), or network-attached storage (NAS) systems. The data records may be located in data centers or cloud storage environments to ensure accessibility and scalability. In some embodiments, the data records for 3GPP Specification 202A, Carrier specific call flows 204A, Historical call failure traces 206A, and Historical call resolutions 208A may be stored in a combination of local and remote storage locations. For example, critical data records may be stored in on-premises data centers for low-latency access, while backup copies and less frequently accessed records may be stored in cloud storage environments for cost-effective scalability and redundancy. Additionally, the data records may be replicated across multiple storage locations to ensure data integrity and availability in case of hardware failures or other disruptions.

Network LLM Training 220A involves training the Network Large Language Model (NLLM) using the inputs from 3GPP Specification 202A, Carrier specific call flows 204A, Historical call failure traces 206A, and Historical call resolutions 208A. This training process ensures that the NLLM 220A comprehensively understands the network's operational standards, carrier-specific protocols, historical failures, and successful resolutions, making the NLLM 220A capable of predicting and addressing potential call flow failures and recommending appropriate solutions.

Network LLM Training 220A includes a Network Large Language Model (NLLM) and facilitates the training of the NLLM with data from 3GPP Specification 202A, carrier specific call flows 204A, historical call failure traces 206A, historical call resolutions 208A, as well as other training data. The NLLM is a sophisticated AI model designed to understand and predict network behaviors and potential failures by learning from extensive datasets.

The types of machines that may be utilized to implement the NLLM include high-performance computing systems, servers, and cloud-based platforms. For example, the NLLM can be trained on powerful graphical processing unit (GPU) clusters, which are well-suited for handling the computational demands of large-scale AI models. In some embodiments, the NLLM may be implemented on dedicated AI servers equipped with multiple GPUs and high-speed interconnects. For example, servers from large manufacturers may be used, featuring configurations such as multiple processors, terabytes of random access memory (RAM), and multiple GPUs. These servers provide the necessary hardware to support the intensive training and inference tasks required by the NLLM. Cloud-based platforms may also be utilized to implement the NLLM. These platforms offer scalable and flexible infrastructure, allowing for the dynamic allocation of resources based on the training requirements. In addition to GPU-based systems, the NLLM may also be implemented on specialized AI hardware, such as custom AI accelerators and/or processors. These specialized hardware solutions are designed to accelerate AI workloads, providing high performance and energy efficiency for training and inference tasks.

Overall, the implementation of the NLLM on these high-performance machines ensures that the model can process and learn from the extensive datasets provided by 3GPP Specification 202A, Carrier specific call flows 204A, Historical call failure traces 206A, and Historical call resolutions 208A. This robust training process enables the NLLM to deliver accurate predictions and effective resolution recommendations, enhancing the network's predictive maintenance capabilities.

Carrier's Generative AI Assistant 230A is an interactive chatbot powered by the NLLM 220A, which network operators can query for predictive maintenance. The Generative AI Assistant 230A allows operators to interact with the NLLM 220A, asking questions about potential network issues and receiving predictive insights and resolution hints. This component facilitates real-time, interactive communication between network operators and the NLLM 220A, enhancing the efficiency of network maintenance operations.

In some embodiments, the Generative AI Assistant 230A can be implemented as a software application running on a server or cloud-based platform, and may be built using natural language processing (NLP) frameworks and libraries which enable the chatbot to understand and generate human-like responses.

The chatbot interacts with the NLLM 220A by sending user queries to the model and receiving responses generated by the model. The NLLM 220A, trained on data from 3GPP Specification 202A, Carrier specific call flows 204A, Historical call failure traces 206A, and Historical call resolutions 208A, processes the queries and generates relevant insights and resolution hints. The chatbot then presents these responses to the network operators in a user-friendly format, allowing them to make informed decisions about network maintenance and optimization.

For example, a network operator may query the chatbot about potential call flow failures that could occur under specific network conditions. The chatbot forwards this query to the NLLM 220A, which analyzes the input and generates a prediction of potential failure patterns. The chatbot then presents this information to the operator, along with recommended resolution strategies (e.g., resolution hints) based on the NLLM's training data.

In some embodiments, the Generative AI Assistant 230A may include additional features to enhance its functionality and user experience. For example, the chatbot may support voice input and output, allowing operators to interact with the system using speech. This can be implemented using speech recognition and text-to-speech technologies. Additionally, the chatbot may integrate with other network management tools and systems, providing a seamless interface for operators to access and act on the insights generated by the NLLM 220A.

Overall, the Generative AI Assistant 230A serves as an interface between network operators and the NLLM 220A, enabling real-time, interactive communication and facilitating proactive network maintenance. By leveraging the predictive capabilities of the NLLM, the chatbot helps operators identify and address potential network issues before they impact service quality, enhancing network reliability and performance.

New failure prediction query operation 224A allows network operators to query the chatbot for new potential failures. This operation enables operators to proactively seek information about potential call flow failures that have not been previously encountered. By querying the NLLM 220A through the Generative AI Assistant 230A, operators can identify and address emerging network issues before they impact service quality.

In some embodiments, the new failure prediction query operation 224A can be implemented as part of the interactive interface provided by the Generative AI Assistant 230A. Network operators can interact with this component through a user-friendly interface, such as a web-based dashboard, a mobile application, or a command-line interface. The interface allows operators to input specific queries related to potential network failures and receive predictive insights generated by the NLLM 220A.

For example, a network operator may use the interface to input a query such as, "What potential call flow failures could occur if we scale up the network capacity in a specific region?" The Generative AI Assistant 230A forwards this query to the NLLM 220A, which processes the input and generates predictions of potential failure patterns based on its training data. The chatbot then presents these predictions to the operator, along with relevant details and context.

In some embodiments, the interface may include advanced query options that allow operators to specify additional parameters or conditions for the predictions. For example, operators may be able to specify the type of network elements involved, the expected traffic load, or the specific services being provided. These parameters help the NLLM 220A generate more accurate and relevant predictions tailored to the specific network scenario.

Once the predictions are generated, the Generative AI Assistant 230A presents the results to the network operator in a clear and concise format. The results may include a list of potential failure patterns, their likelihood of occurrence, and any relevant historical data or context. The operator can then use this information to make informed decisions about network maintenance and optimization, proactively addressing potential issues before they impact service quality.

Overall, the new failure prediction query operation 224A enables network operators to leverage the predictive capabilities of the NLLM 220A to identify and address potential network failures that have not been previously encountered. By providing a user-friendly interface for querying the NLLM, this component helps operators stay ahead of emerging network issues and maintain optimal network performance.

New call flow failure pattern prediction operation 232A generates new potential call flow failure patterns in response to the queries at 224A that have not been previously encountered. This operation leverages the NLLM 220A's predictive capabilities to identify novel failure patterns, providing network operators with insights into potential issues that may arise in the future.

At component 232A, the NLLM 220A analyzes the query and the associated data to identify new call flow failure patterns that have not been previously encountered. In some embodiments, the NLLM 220A uses advanced machine learning techniques, such as deep learning and natural language processing, to understand the query's context and generate relevant predictions. For example, the NLLM 220A may consider factors such as network topology, traffic load, and historical failure data to predict potential failure patterns.

In response to the query above about scaling up network capacity, the NLLM 220A may generate a new call flow failure pattern indicating that increased traffic load could lead to congestion at specific network nodes, resulting in call drops or degraded service quality. The NLLM 220A may also identify potential bottlenecks in the network infrastructure, such as limited bandwidth or insufficient processing power at certain nodes, which could contribute to the predicted failures.

Once the new call flow failure patterns are generated, the Generative AI Assistant 230A presents the results to the network operator in a clear and concise format. The results may include a detailed description of the predicted failure patterns, their likelihood of occurrence, and any relevant historical data or context. The operator can then use this information to make informed decisions about network maintenance and optimization, proactively addressing potential issues before they impact service quality.

Overall, the new call flow failure pattern prediction operation 232A enables the NLLM 220A to generate novel failure patterns in response to operator queries, providing valuable insights into potential network issues that have not been previously encountered. By leveraging the predictive capabilities of the NLLM, this component helps network operators stay ahead of emerging network issues and maintain optimal network performance.

Resolution query operation 236A allows network operators to query the chatbot for resolution hints. This operation enables operators to seek guidance on resolving potential call flow failures identified by the NLLM 220A. By querying the Generative AI Assistant 230A, operators can obtain actionable resolution hints to address predicted network issues.

In some embodiments, the resolution query operation 236A can be implemented as part of the interactive interface provided by the Generative AI Assistant 230A. Network operators can interact with this component through a user-friendly interface, such as a web-based dashboard, a mobile application, or a command-line interface. The interface allows operators to input specific queries related to potential resolutions for the predicted network failures and receive resolution hints generated by the NLLM 220A.

For example, after receiving a prediction of potential call flow failures from the new call flow failure pattern prediction operation 232A, a network operator may use the interface to input a query such as, "What are the recommended resolutions for the predicted call flow failures due to increased traffic load in a specific region?" The Generative AI Assistant 230A forwards this query to the NLLM 220A, which processes the input and generates resolution hints based on its training data.

The NLLM 220A analyzes the query and the associated data to generate specific recommendations for resolving the predicted call flow failures. In some embodiments, the NLLM 220A uses advanced machine learning techniques, such as deep learning and natural language processing, to understand the query's context and generate relevant resolution hints. For example, the NLLM 220A may consider factors such as network topology, traffic load, historical failure data, and past resolution strategies to generate effective resolution hints.

Overall, the resolution query operation 236A enables network operators to leverage the predictive capabilities of the NLLM 220A to obtain actionable resolution hints for potential network failures that have not been previously encountered. By providing a user-friendly interface for querying the NLLM, this component helps operators address emerging network issues effectively and maintain optimal network performance.

Resolution recommendation operation 234A provides resolution hints for the potential call flow failure patterns. This operation generates specific recommendations for resolving the predicted call flow failures, based on the NLLM 220A's training data and predictive insights. The resolution hints provided by the Generative AI Assistant 230A help network operators implement effective solutions to prevent or mitigate network issues.

In response to the query above about resolving call flow failures due to increased traffic load, the NLLM 220A may generate resolution hints such as optimizing the load balancing algorithms to distribute traffic more evenly across network nodes, upgrading the bandwidth capacity of specific network segments, or implementing traffic prioritization policies to ensure critical services are not impacted. The NLLM 220A may also recommend specific configuration changes or software updates to address the identified bottlenecks and improve overall network performance.

Once the resolution hints are generated, the Generative AI Assistant 230A presents the results to the network operator in a clear and concise format. The results may include a detailed description of the recommended resolutions, their likelihood of success, and any relevant historical data or context. The operator can then use this information to implement the recommended resolutions and optimize the network to prevent or mitigate the predicted failures.

Overall, the resolution recommendation operation 234A enables the NLLM 220A to generate specific and actionable resolution hints in response to operator queries, providing valuable guidance for addressing potential network issues. By leveraging the predictive capabilities of the NLLM, this component helps network operators implement effective solutions to maintain optimal network performance and prevent service disruptions.

Live failure simulation operation 242A involves simulating the potential failure patterns in a controlled environment. This operation allows network operators to test the predicted call flow failures in a controlled setting, typically during off-business hours, to evaluate their likelihood of occurrence and the effectiveness of the recommended resolutions. The live failure simulation operation 242A helps validate the NLLM 220A's predictions and ensures that the recommended solutions are practical and effective.

Continuing the example from the previous discussions, suppose a network operator has queried the Generative AI Assistant 230A about potential call flow failures due to increased traffic load in a specific region. The NLLM 220A, through the new call flow failure pattern prediction operation 232A, has identified potential failure patterns such as congestion at specific network nodes and bottlenecks in the network infrastructure. The operator then queries for resolution hints using the resolution query operation 236A, and the NLLM 220A, through the resolution recommendation operation 234A, provides recommendations such as optimizing load balancing algorithms, upgrading bandwidth capacity, and implementing traffic prioritization policies.

At component 242A, the network operator can simulate these predicted failure patterns and test the recommended resolutions in a controlled environment. For example, the operator may set up a test network that mirrors the live network's configuration and traffic conditions. The operator can then artificially increase the traffic load to simulate the predicted congestion and bottlenecks identified by the NLLM 220A.

During the simulation, the operator can apply the recommended resolutions provided by the NLLM 220A. For instance, the operator may adjust the load balancing algorithms to distribute traffic more evenly across network nodes, upgrade the bandwidth capacity of specific network segments, and implement traffic prioritization policies to ensure critical services are not impacted. The operator can then monitor the network's performance to evaluate the effectiveness of these resolutions in mitigating the simulated failures.

In some embodiments, the simulation environment may include tools and software for network performance monitoring and analysis. These tools can help the operator track key performance indicators (KPIs) such as latency, packet loss, and throughput, providing insights into how well the recommended resolutions address the simulated failures. The operator can also use these tools to identify any additional issues that may arise during the simulation and make further adjustments as needed.

Once the simulation is complete, the operator can assess the results to determine the likelihood of the predicted failures occurring in the live network and the effectiveness of the recommended resolutions. The insights gained from the simulation can then be fed back into the NLLM 220A for continuous learning and improvement, ensuring that the model's predictions and recommendations remain accurate and relevant.

Overall, the live failure simulation operation 242A enables network operators to validate the NLLM 220A's predictions and test the recommended resolutions in a controlled environment. By simulating potential failure patterns and applying the suggested solutions, operators can proactively address network issues before they impact service quality, enhancing network reliability and performance.

Live resolution testing operation 244A tests the recommended resolutions in the live network. This operation involves implementing the resolution hints provided by the Generative AI Assistant 230A in the live network to address the simulated failures. By testing the resolutions in a real-world environment, network operators can assess their effectiveness and make necessary adjustments to optimize network performance.

Building on the previous example, after the network operator has simulated the predicted call flow failures and tested the recommended resolutions in a controlled environment during operation 242A, the next step is to implement these resolutions in the live network. The insights gained from the simulation provide a valuable foundation for this live testing phase.

During the live resolution testing operation 244A, the network operator applies the recommended resolutions, such as optimizing load balancing algorithms, upgrading bandwidth capacity, and implementing traffic prioritization policies, to the live network. The operator closely monitors the network's performance to evaluate the effectiveness of these resolutions in addressing the actual network issues.

The previous simulation in operation 242A benefits the live testing in several ways. The simulation helps validate the recommended resolutions by providing a controlled environment to test their effectiveness. This reduces the risk of implementing untested solutions in the live network, ensuring that only the most effective resolutions are applied. The simulation provides detailed performance insights, such as the impact of the resolutions on key performance indicators (KPIs) like latency, packet loss, and throughput. These insights help the operator understand how the resolutions will perform in the live network and make informed decisions during the live testing phase. By identifying potential issues and bottlenecks during the simulation, the operator can develop contingency plans and rollback strategies for the live testing phase. This helps mitigate the risk of adverse impacts on the live network and ensures a smooth implementation of the resolutions. The feedback from the simulation may be used to refine the NLLM 220A, improving its predictive accuracy and resolution recommendations. This continuous learning process ensures that the NLLM remains relevant and effective in addressing emerging network issues.

During the live resolution testing operation 244A, the operator monitors the network's performance in real-time, using tools and software for network performance monitoring and analysis. The operator tracks KPIs to assess the effectiveness of the resolutions and identify any additional issues that may arise. If necessary, the operator can make further adjustments to optimize the network performance and ensure that the resolutions effectively address the predicted failures.

Overall, the live resolution testing operation 244A benefits from the previous simulation in operation 242A by providing a validated and informed approach to implementing resolutions in the live network. This proactive and iterative process helps network operators maintain optimal network performance, enhance reliability, and reduce the likelihood of service disruptions.

Network KPIs monitoring operation 252A involves monitoring Key Network Performance Indicators (KPIs) during the optimization process. This operation ensures that the network's performance is continuously monitored, allowing operators to detect and mitigate any adverse impacts resulting from the implemented resolutions. The network KPIs monitoring operation 252A helps maintain optimal network performance and service quality.

In some embodiments, the KPIs that may be useful for monitoring network performance include latency, packet loss, throughput, jitter, call drop rate, and the like. Latency measures the time it takes for data to travel from the source to the destination and back. High latency can indicate network congestion or inefficiencies, which may impact the quality of real-time services such as voice and video calls. Packet loss measures the percentage of data packets that are lost during transmission. High packet loss can result in poor quality of service, as lost packets may need to be retransmitted, causing delays and interruptions. Throughput measures the amount of data transmitted over the network in a given period. Monitoring throughput helps ensure that the network can handle the expected traffic load and maintain efficient data transfer rates. Jitter measures the variation in packet arrival times. High jitter can cause issues with real-time applications, such as voice and video calls, leading to poor quality and interruptions. Call drop rate measures the percentage of calls that are unexpectedly terminated. A high call drop rate can indicate network instability or capacity issues, impacting the overall user experience.

During the network KPIs monitoring operation 252A, network operators may use tools and software for real-time performance monitoring and analysis. These tools can provide visualizations and alerts for the monitored KPIs, allowing operators to quickly identify and address any issues.

By continuously monitoring these KPIs, network operators can ensure that the implemented resolutions are effective and that the network maintains optimal performance. If any adverse impacts are detected, operators can take corrective actions to mitigate the issues and prevent service disruptions. Overall, the network KPIs monitoring operation 252A plays a useful role in maintaining network reliability and service quality, ensuring that the network operates efficiently and meets the performance expectations of users.

Pre-emptive optimization of network operation 250A involves modifying the network configuration based on the simulation results to prevent potential failures. This operation enables network operators to proactively optimize the network configuration, addressing the predicted call flow failures before they occur. By implementing the recommended resolutions and optimizing the network pre-emptively, operators can enhance network reliability and reduce the likelihood of service disruptions.

Building on the previous example, after the network operator has simulated the predicted call flow failures and tested the recommended resolutions in a controlled environment during operation 242A, and subsequently validated these resolutions in the live network during operation 244A, the next step is to apply these insights to pre-emptively optimize the network. The insights gained from the simulations and live testing provide a valuable foundation for this optimization phase.

During the pre-emptive optimization of network operation 250A, the network operator implements the recommended resolutions, such as optimizing load balancing algorithms, upgrading bandwidth capacity, and implementing traffic prioritization policies, across the network. The operator makes these changes to the network configuration to address the potential failure patterns identified by the NLLM 220A.

For example, if the NLLM 220A predicted that increased traffic load could lead to congestion at specific network nodes, the operator may pre-emptively adjust the load balancing algorithms to distribute traffic more evenly across these nodes. Similarly, if the NLLM 220A identified potential bottlenecks in the network infrastructure, the operator may upgrade the bandwidth capacity of specific network segments or implement traffic prioritization policies to ensure critical services are not impacted.

In some embodiments, the pre-emptive optimization process may involve using network management tools and software to automate the implementation of the recommended resolutions. These tools can help the operator efficiently apply the changes to the network configuration and monitor the impact of these changes on network performance.

By proactively optimizing the network configuration based on the simulation results, the operator can prevent the predicted call flow failures from occurring in the first place. This approach helps to increase network performance, reduce the likelihood of service disruptions, and improve overall customer experience. Additionally, the operator can continuously monitor network performance Key Performance Indicators (KPIs) during the optimization process to detect and mitigate any adverse impacts.

Overall, the pre-emptive optimization of network operation 250A enables network operators to leverage the insights gained from the NLLM 220A's predictions and the results of the simulations and live testing to proactively address potential network issues. This proactive approach helps maintain optimal network performance, enhance reliability, and reduce operational costs associated with network maintenance and troubleshooting.

Prompt engineering 222A involves iterative prompt engineering by network domain experts to enhance the NLLM's understanding. This operation ensures that the NLLM 220A is continuously refined and improved through expert input, enabling the NLLM 220A to provide more accurate and relevant predictions and recommendations. Prompt engineering 222A helps maintain the NLLM 220A's effectiveness and adaptability in dynamic network environments.

In some embodiments, prompt engineering 222A may involve network domain experts crafting and refining the prompts used to query the NLLM 220A. These experts analyze the responses generated by the NLLM and adjust the prompts to ensure that the model accurately interprets the operators'questions and provides relevant and actionable insights. For example, if the NLLM's responses to certain queries are ambiguous or not sufficiently detailed, the experts may modify the prompts to elicit more precise and informative answers.

The iterative nature of prompt engineering 222A allows for continuous improvement of the NLLM's performance. As network conditions and requirements evolve, the prompts can be updated to reflect new scenarios and challenges. This iterative process ensures that the NLLM remains effective in addressing emerging network issues and providing valuable guidance to network operators.

For example, if network operators frequently encounter a new type of call flow failure that was not previously considered, the domain experts can develop new prompts to query the NLLM about this specific failure. By incorporating these new prompts into the system, the NLLM can learn to recognize and address the new failure pattern, providing relevant predictions and resolution hints.

In some embodiments, prompt engineering 222A may also involve the use of feedback loops, where the responses generated by the NLLM are evaluated and used to further refine the prompts. This feedback-driven approach ensures that the NLLM continuously learns from its interactions with network operators and improves its predictive accuracy and resolution recommendations over time.

Overall, prompt engineering 222A plays a useful role in maintaining the NLLM 220A's effectiveness and adaptability. By iteratively refining the prompts used to query the NLLM, network domain experts ensure that the model provides accurate and relevant insights, helping network operators address potential issues and maintain optimal network performance.

Evaluation 240A involves evaluating the effectiveness of the recommended resolutions and feeding the results back into the NLLM for continuous learning. This operation ensures that the NLLM 220A is continuously updated with new data and insights, improving the predictive accuracy and resolution recommendations over time. The evaluation 240A process helps maintain the NLLM 220A's relevance and effectiveness in addressing emerging network issues.

In some embodiments, the evaluation process begins after the live resolution testing operation 244A, where the recommended resolutions are implemented in the live network. Network operators monitor the network's performance to assess the effectiveness of these resolutions in addressing the predicted call flow failures. Key Performance Indicators (KPIs) such as latency, packet loss, throughput, jitter, and call drop rate are tracked to determine the impact of the resolutions on network performance.

If the implemented resolutions successfully mitigate the predicted failures and improve network performance, the results are considered positive. These successful outcomes are then fed back into the NLLM 220A to enhance its training data. By incorporating these new data points, the NLLM can learn from the successful resolutions and improve its predictive accuracy and resolution recommendations for future queries.

In cases where the implemented resolutions do not fully address the predicted failures or introduce new issues, the evaluation process identifies the shortcomings and areas for improvement. Network operators and domain experts may analyze the results to understand why the resolutions were not effective and develop new strategies to address the issues. These insights are also fed back into the NLLM 220A, enabling the model to learn from the less successful outcomes and refine its predictions and recommendations.

The evaluation process may involve multiple iterations, with continuous monitoring and feedback loops to ensure that the NLLM 220A remains up-to-date and effective. By regularly evaluating the effectiveness of the recommended resolutions and incorporating new data and insights, the NLLM can adapt to changing network conditions and emerging issues, providing more accurate and relevant guidance to network operators.

Overall, evaluation 240A plays a useful role in maintaining the NLLM 220A's relevance and effectiveness. By continuously assessing the impact of the recommended resolutions and feeding the results back into the model, the evaluation process ensures that the NLLM evolves and improves over time, helping network operators address potential issues and maintain optimal network performance.

Figure 2B:
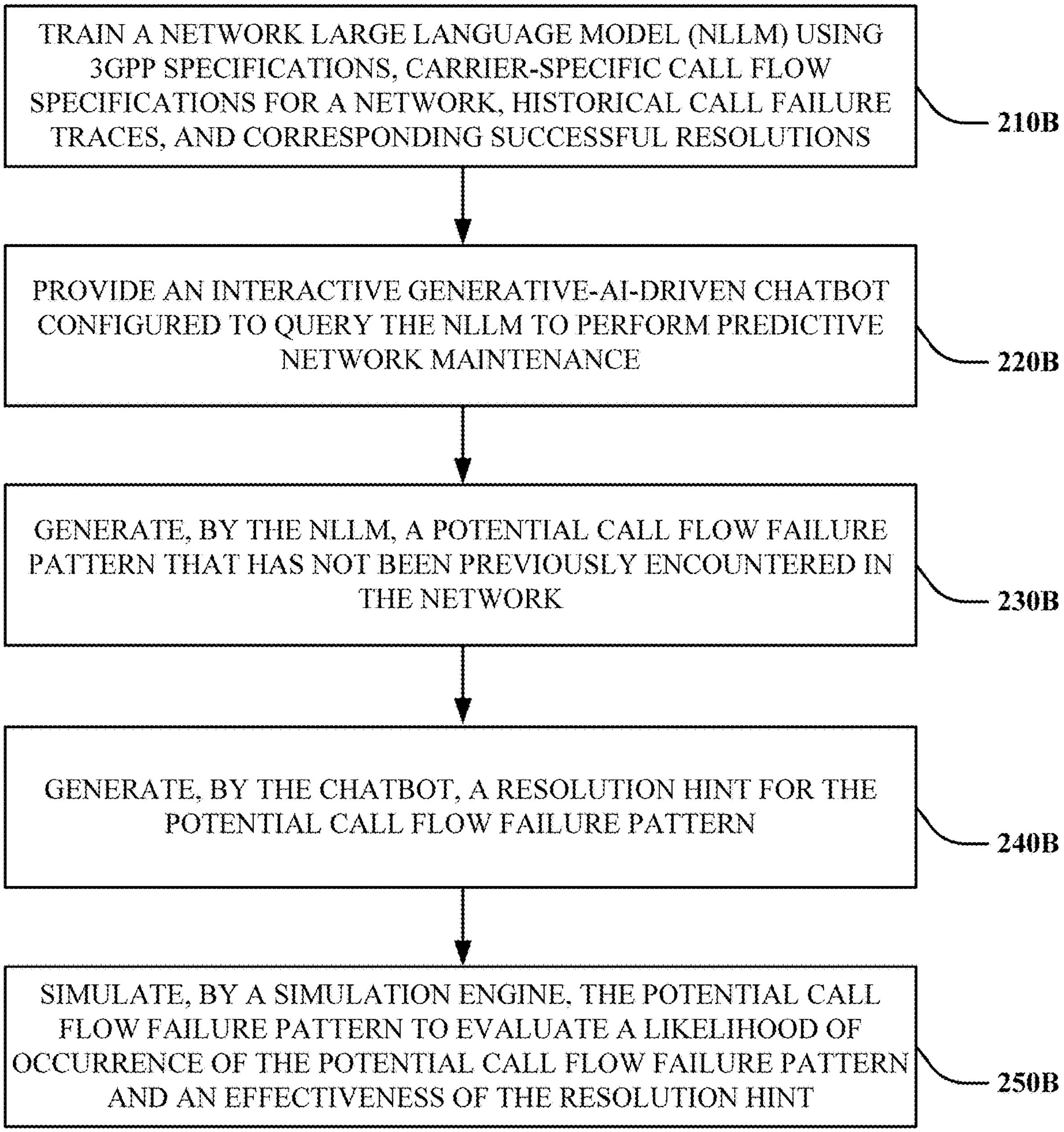
FIG. 2B depicts an illustrative embodiment of a method in accordance with various aspects described herein.

FIG. 2B depicts an illustrative embodiment of a method in accordance with various aspects described herein. Method 200B may be useful for predictive network maintenance using a Network Large Language Model (NLLM) and a Generative AI-driven chatbot. In some embodiments, method 200B may be performed by an electronic system, a server, a processing system, or any other system capable of performing as described herein.

At block 210B, the method 200B involves training a Network Large Language Model (NLLM) using 3GPP specifications, carrier-specific call flow specifications for a network, historical call failure traces, and corresponding successful resolutions. In some embodiments, block 210B includes compiling a comprehensive dataset that encompasses standard protocols, carrier-specific nuances, historical failure patterns, and effective resolution strategies. For example, the NLLM may be trained on data from 3GPP Specification 202A, Carrier specific call flows 204A, Historical call failure traces 206A, and Historical call resolutions 208A. Further, in some embodiments, augmenting the NLLM capability comprises training using iterative prompt engineering by network domain experts, and/or using feedback from network operators to improve the NLLM's predictive accuracy and resolution recommendations.

At block 220B, the method 200B provides an interactive Generative-AI-driven chatbot configured to query the NLLM to perform predictive network maintenance. In some embodiments, block 220B includes deploying the chatbot on a server or cloud-based platform, enabling network operators to interact with the NLLM through a user-friendly interface. For example, the Generative AI Assistant 230A may be implemented as a web-based dashboard or mobile application that allows operators to input queries and receive predictive insights.

At block 230B, the method 200B involves generating, by the NLLM, a potential call flow failure pattern that has not been previously encountered in the network. In some embodiments, block 230B includes analyzing the input query and associated data to identify novel failure patterns. For example, the NLLM may consider factors such as network topology, traffic load, and historical failure data to predict potential failure patterns that have not been seen before. Further, in some embodiments, the NLLM is configured to prioritize potential call flow failure patterns based on their likelihood of occurrence and potential impact on network performance.

At block 240B, the method 200B involves generating, by the chatbot, a resolution hint for the potential call flow failure pattern. In some embodiments, block 240B includes using the NLLM's training data to generate specific recommendations for resolving the predicted call flow failures. For example, the chatbot may provide resolution hints such as optimizing load balancing algorithms, upgrading bandwidth capacity, or implementing traffic prioritization policies.

At block 250B, the method involves simulating, by a simulation engine, the potential call flow failure pattern to evaluate a likelihood of occurrence of the potential call flow failure pattern and an effectiveness of the resolution hint. In some embodiments, block 250B includes setting up a test network that mirrors the live network's configuration and traffic conditions, and applying the recommended resolutions to evaluate their effectiveness. For example, the simulation may involve artificially increasing the traffic load to simulate congestion and testing the impact of the recommended resolutions on key performance indicators (KPIs) such as latency, packet loss, and throughput. In some embodiments, the simulation engine is configured to simulate the potential call flow failure pattern in a controlled environment during off-business hours to minimize impact on live network operations.

In some embodiments, method 200B includes training the NLLM using simulation results including the likelihood of occurrence of the potential call flow failure pattern, modifying a network configuration based on the simulation results to prevent the potential call flow failure pattern from occurring; continuously monitoring network performance Key Performance Indicators (KPIs) to detect and mitigate any adverse impact; and/or generating a report summarizing multiple potential call flow failure patterns and associated resolution hints and simulation results.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
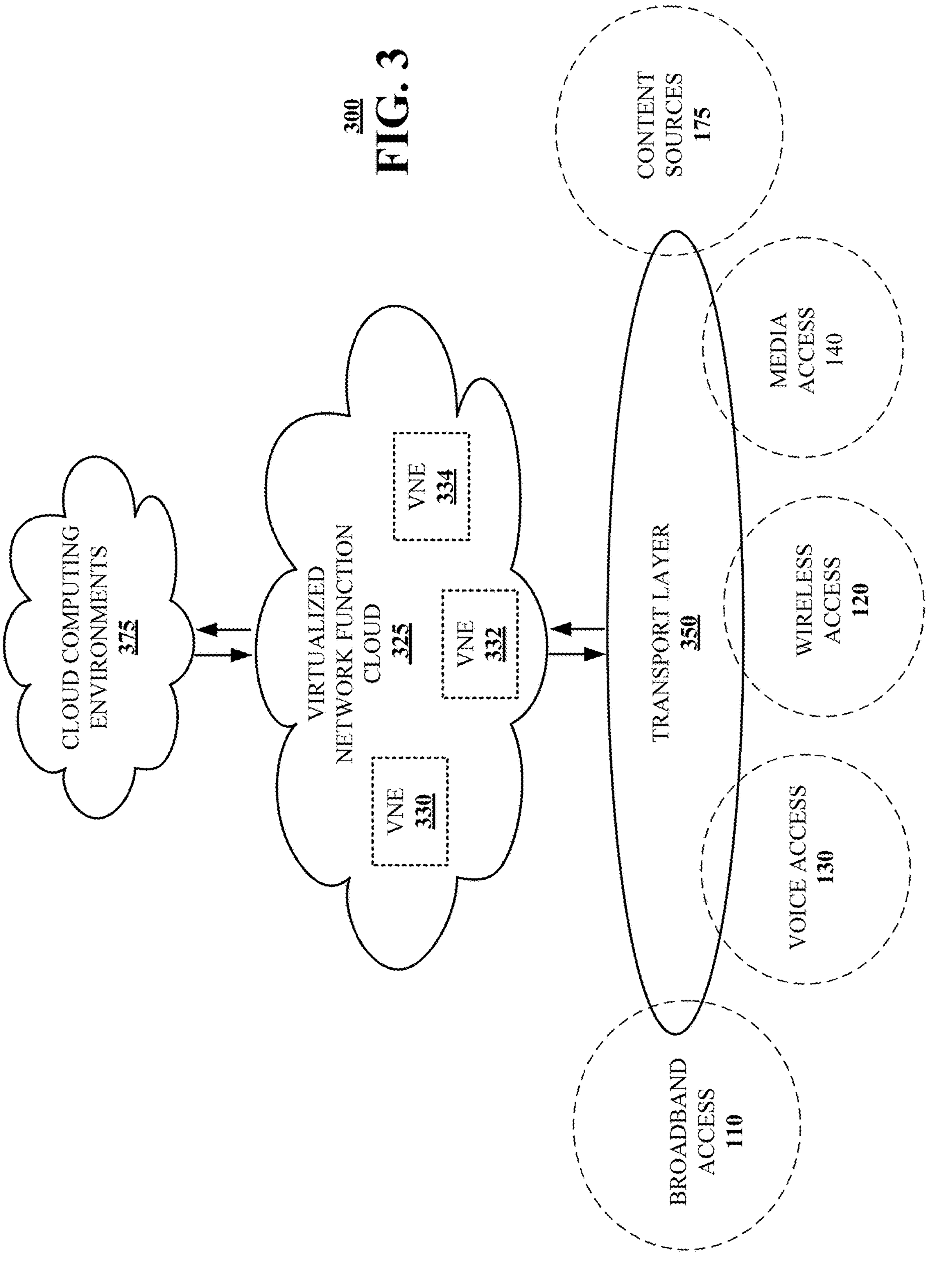
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the system, subsystems, and functions described herein. For example, virtualized communication network 300 can facilitate in whole or in part Generative AI-driven predictive maintenance for communications networks In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
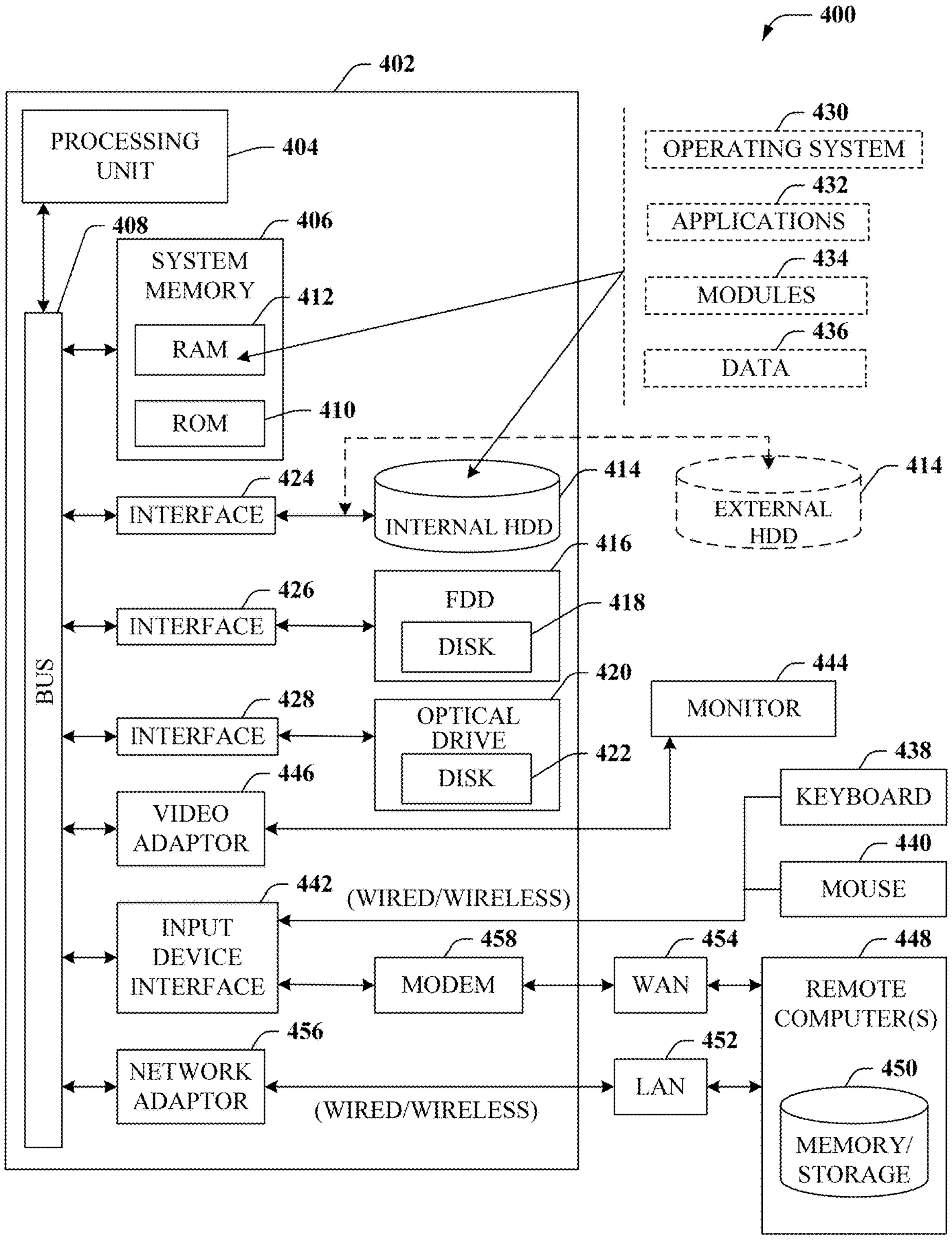
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part Generative AI-driven predictive maintenance for communications networks.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
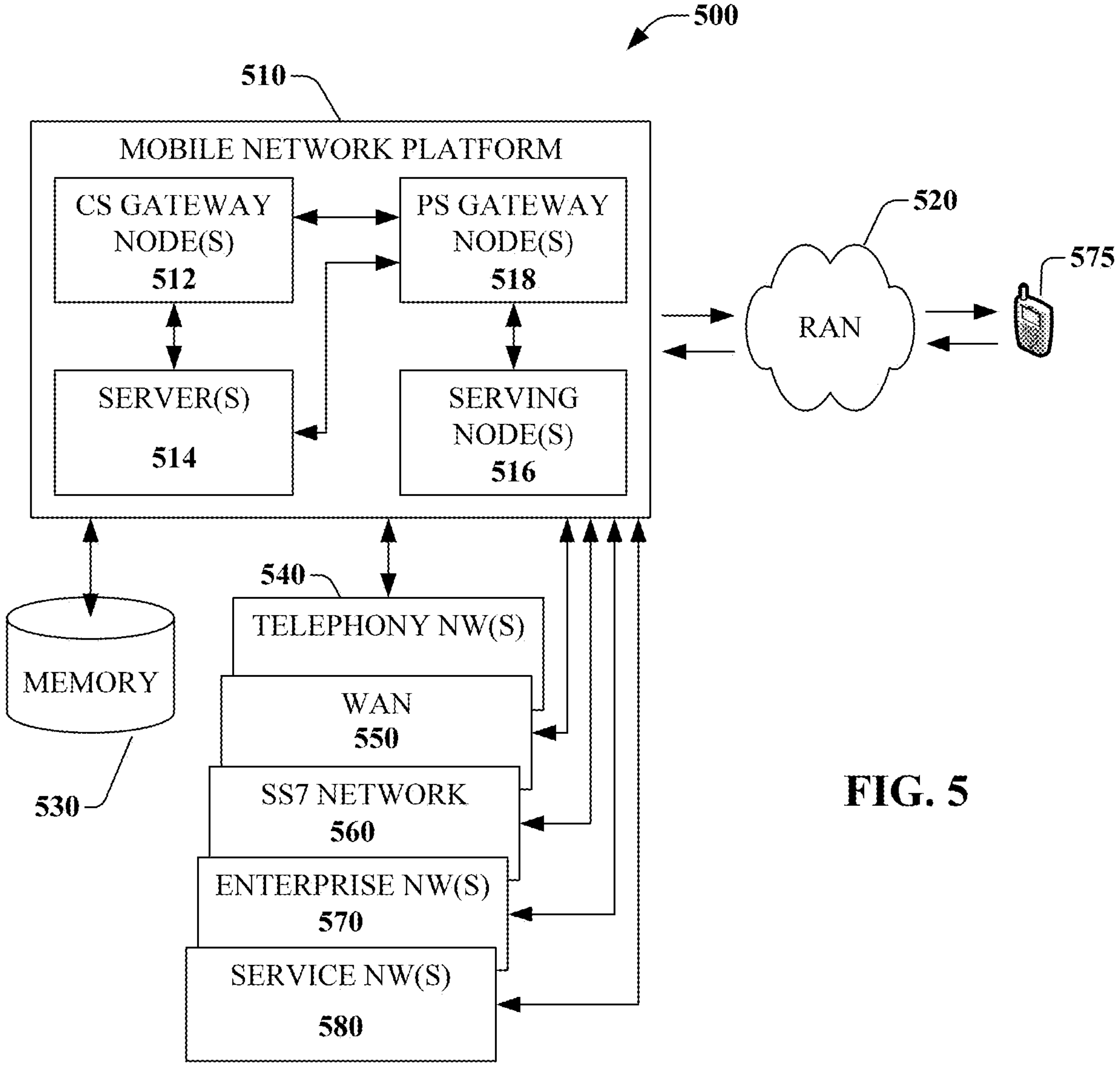
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part Generative AI-driven predictive maintenance for communications networks. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
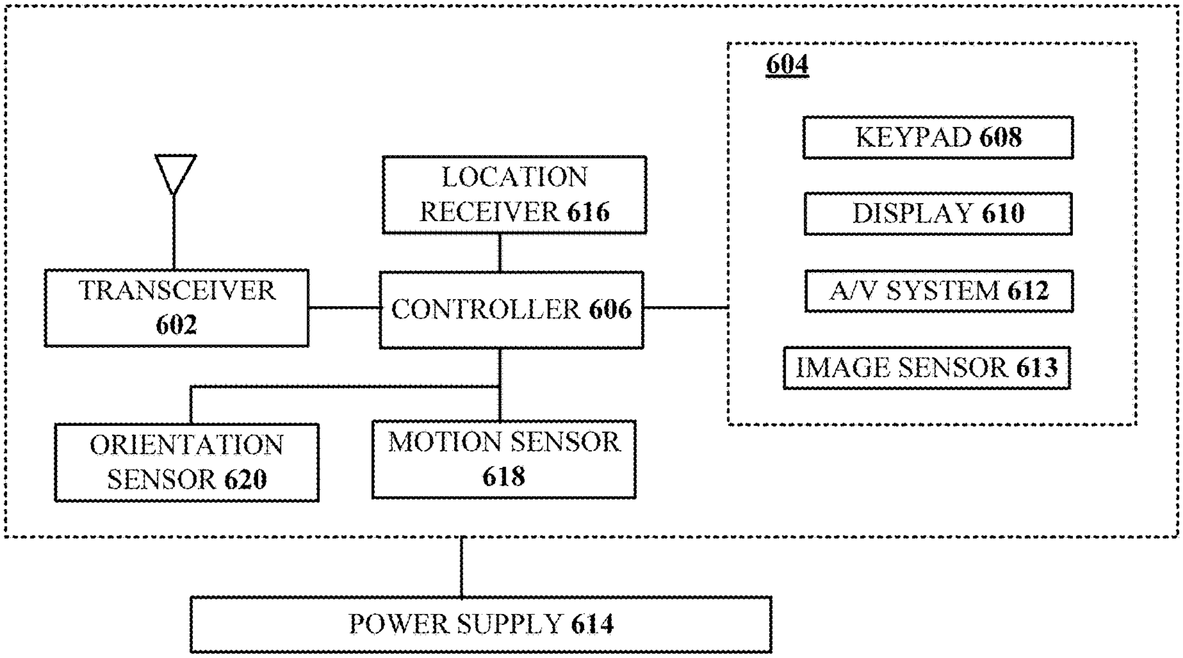
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part Generative AI-driven predictive maintenance for communications networks.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

training a Network Large Language Model (NLLM) using 3GPP specifications, carrier-specific call flow specifications for a network, historical call failure traces, and corresponding successful resolutions;

providing an interactive Generative AI-driven chatbot configured to query the NLLM to perform predictive network maintenance;

generating, by the NLLM, a potential call flow failure pattern that has not been previously encountered in the network;

generating, by the chatbot, a resolution hint for the potential call flow failure pattern; and simulating, by a simulation engine, the potential call flow failure pattern to evaluate a likelihood of occurrence of the potential call flow failure pattern and an effectiveness of the resolution hint.

2. The device of claim 1, wherein the operations further comprise:

training the NLLM using simulation results including the likelihood of occurrence of the potential call flow failure pattern.

3. The device of claim 2, wherein the operations further comprise:

modifying a network configuration based on the simulation results to prevent the potential call flow failure pattern from occurring.

4. The device of claim 1, wherein the training the NLLM comprises training using iterative prompt engineering by network domain experts.

5. The device of claim 1, wherein the interactive Generative AI-driven chatbot is configured to provide real-time recommendations for network optimization based on the NLLM's predictions.

6. The device of claim 1, wherein the simulation engine is configured to simulate the potential call flow failure pattern in a controlled environment during off-business hours to minimize impact on live network operations.

7. The device of claim 1, wherein the operations further comprise continuously monitoring network performance Key Performance Indicators (KPIs) to detect and mitigate any adverse impact.

8. The device of claim 1, wherein the operations further comprise training the NLLM using feedback from network operators to improve the NLLM's predictive accuracy and resolution recommendations.

9. The device of claim 1, wherein the operations further comprise generating a report summarizing multiple potential call flow failure patterns and associated resolution hints and simulation results.

10. The device of claim 1, wherein the NLLM is configured to prioritize potential call flow failure patterns based on their likelihood of occurrence and potential impact on network performance.

11. A non-transitory machine-readable medium, comprising executable instructions that, when executed by a processing system including a processor, facilitate performance of operations, the operations comprising:

providing an interactive Generative AI-driven chatbot configured to query a Network Large Language Model (NLLM) that has been trained on 3GPP specifications and carrier-specific call flow specifications for a network;

receiving, by the chatbot, a query regarding potential call flow failures;

generating, by the NLLM, in response to the query, a potential call flow failure pattern that has not been previously encountered in the network;

generating, by the chatbot, a resolution hint for the potential call flow failure pattern; and simulating, by a simulation engine, the potential call flow failure pattern to evaluate a likelihood of occurrence of the potential call flow failure pattern and an effectiveness of the resolution hint.

12. The non-transitory machine-readable medium of claim 11, wherein the simulating is performed in a controlled environment outside regular business hours to reduce impact on live network operations.

13. The non-transitory machine-readable medium of claim 11, wherein the operations further comprise training the NLLM using simulation results including the likelihood of occurrence of the potential call flow failure pattern.

14. The non-transitory machine-readable medium of claim 13, wherein the operations further comprise modifying a network configuration based on the simulation results to prevent the potential call flow failure pattern from occurring.

15. The non-transitory machine-readable medium of claim 14, wherein the operations further comprise monitoring one or more network performance Key Performance Indicators (KPIs) during and/or after the modifying, and mitigating an adverse impact responsive to the monitoring.

16. A method, comprising:

training by a processing system including a processor, a Network Large Language Model (NLLM) using 3GPP specifications, carrier-specific call flow specifications for a network, historical call failure traces, and corresponding successful resolutions;

generating, by the processing system using the NLLM, a potential call flow failure pattern that has not been previously encountered in the network;

generating, by the processing system using the NLLM, a resolution hint for the potential call flow failure pattern;

training the NLLM, by the processing system, using simulation results from a simulation of the potential call flow pattern and the resolution hint; and modifying a network configuration based on the simulation results to prevent the potential call flow failure pattern from occurring in the network.

17. The method of claim 16, further comprising:

providing an interactive Generative AI-driven chatbot configured to query the NLLM to perform predictive network maintenance.

18. The method of claim 17, wherein the chatbot is configured to provide real-time recommendations for network optimization based on the NLLM's predictions.

19. The method of claim 16, wherein the NLLM is configured to prioritize potential call flow failure patterns based on a likelihood of occurrence and a potential impact on network performance.

20. The method of claim 16, wherein the simulation is performed in a controlled environment during off-business hours to minimize impact on live network operations.

* * * * *